US008646259B2

(12) United States Patent
Gonze et al.

(10) Patent No.: US 8,646,259 B2
(45) Date of Patent: Feb. 11, 2014

(54) ELECTRONICALLY HEATED SELECTIVE CATALYTIC REDUCTION (SCR) DEVICE

(75) Inventors: Eugene V. Gonze, Pinckney, MI (US); Michael J. Paratore, Jr., Howell, MI (US); Paul Jasinkiewicz, Northville, MI (US); Christopher J. Kalebjian, Columbus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 13/082,947

(22) Filed: Apr. 8, 2011

(65) Prior Publication Data
US 2012/0255285 A1 Oct. 11, 2012

(51) Int. Cl.
*F01N 3/10* (2006.01)
(52) U.S. Cl.
USPC .................... 60/301; 60/286; 60/300; 60/303
(58) Field of Classification Search
USPC .................... 60/274, 275, 286, 295, 300, 303
See application file for complete search history.

(56) References Cited

U.S. PATENT DOCUMENTS

| | | | | |
|---|---|---|---|---|
| 5,839,273 A | * | 11/1998 | Maus | 60/274 |
| 5,852,929 A | * | 12/1998 | Kato et al. | 60/274 |
| 6,698,191 B2 | * | 3/2004 | Xu et al. | 60/286 |
| 6,729,125 B2 | * | 5/2004 | Suga et al. | 60/285 |
| 6,742,326 B2 | * | 6/2004 | Xu et al. | 60/284 |
| 7,631,491 B2 | * | 12/2009 | Lange | 60/295 |
| 8,151,555 B2 | * | 4/2012 | Niimi et al. | 60/286 |

* cited by examiner

*Primary Examiner* — Binh Q Tran
(74) *Attorney, Agent, or Firm* — Cantor Colburn LLP

(57) ABSTRACT

An exhaust gas treatment system is provided having an internal combustion engine, an exhaust gas conduit, a passive selective catalyst reduction (SCR) device, a heated SCR device, and a control module. The exhaust gas conduit is in fluid communication with and is configured to receive an exhaust gas from the internal combustion engine. The passive SCR device is in fluid communication with the exhaust gas conduit and is configured to receive the exhaust gas. The passive SCR includes a passive SCR temperature profile. The heated SCR device is in fluid communication with the exhaust gas conduit and is configured to receive the exhaust gas. The heated SCR device is located upstream of the passive SCR. The heated SCR is selectively activated to produce heat. The control module is in communication with the heated SCR and the engine and includes a control logic for determining the passive SCR temperature profile.

19 Claims, 2 Drawing Sheets

ELECTRONICALLY HEATED SELECTIVE CATALYTIC REDUCTION (SCR) DEVICE

FIELD OF THE INVENTION

Exemplary embodiments of the invention relate to exhaust gas treatment systems for internal combustion engines and, more particularly, to an exhaust gas treatment system having a selectively heated selective catalyst reduction ("SCR") device.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing $NO_x$ emissions is a selective catalyst reduction ("SCR") device. The SCR device usually includes a substrate, where a SCR catalyst compound is applied to the substrate. A reductant is typically sprayed into hot exhaust gases upstream of the SCR device. The reductant may be a urea solution that decomposes to ammonia ($NH_3$) in the hot exhaust gases, and is subsequently absorbed by the SCR device. The $NH_3$ then reduces the $NO_x$ to nitrogen in the presence of the SCR catalyst.

Some types of engines tend to produce cooler exhaust temperatures, especially during engine startup and during moderate operating conditions. For example, highly efficient engines tend to have cooler exhaust temperatures. Cooler exhaust temperatures also tend to occur during low load driving as well. However, cooler exhaust temperatures tend to reduce the effectiveness of the SCR device. This is because a SCR device needs to reach a minimum operating or light-off temperature to convert the urea to ammonia, which is typically about 200° C., to effectively filter $NO_x$. In low temperature environments, an SCR device may not efficiently clean exhaust until several minutes after an engine has been started.

One approach to increasing the effectiveness of the SCR device involves having the engine operate at a higher temperature, which in turn also raises the temperature of the exhaust gases. However, this approach involves the engine operating at a lower level of efficiency to create the hotter exhaust gas, which results in greater fuel consumption. Accordingly, it is desirable to provide an efficient approach to increasing the temperature of the exhaust gases upstream of the SCR device.

SUMMARY OF THE INVENTION

In one exemplary embodiment of the invention an exhaust gas treatment system is provided having an internal combustion engine, an exhaust gas conduit, a passive selective catalyst reduction ("SCR") device, a heated SCR device, and a control module. The exhaust gas conduit is in fluid communication with and is configured to receive an exhaust gas from the internal combustion engine. The passive SCR device is in fluid communication with the exhaust gas conduit and is configured to receive the exhaust gas. The passive SCR includes a passive SCR temperature profile. The heated SCR device is in fluid communication with the exhaust gas conduit and is configured to receive the exhaust gas. The heated SCR device is located upstream of the passive SCR. The heated SCR is selectively activated to produce heat. The control module is in communication with the heated SCR and the engine and includes a control logic for determining the passive SCR temperature profile. The control module includes a control logic for determining if the passive SCR temperature profile is below a threshold value. The control module also includes a control logic for activating the heated SCR, where the heated SCR is activated if the passive SCR temperature is below the threshold value.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
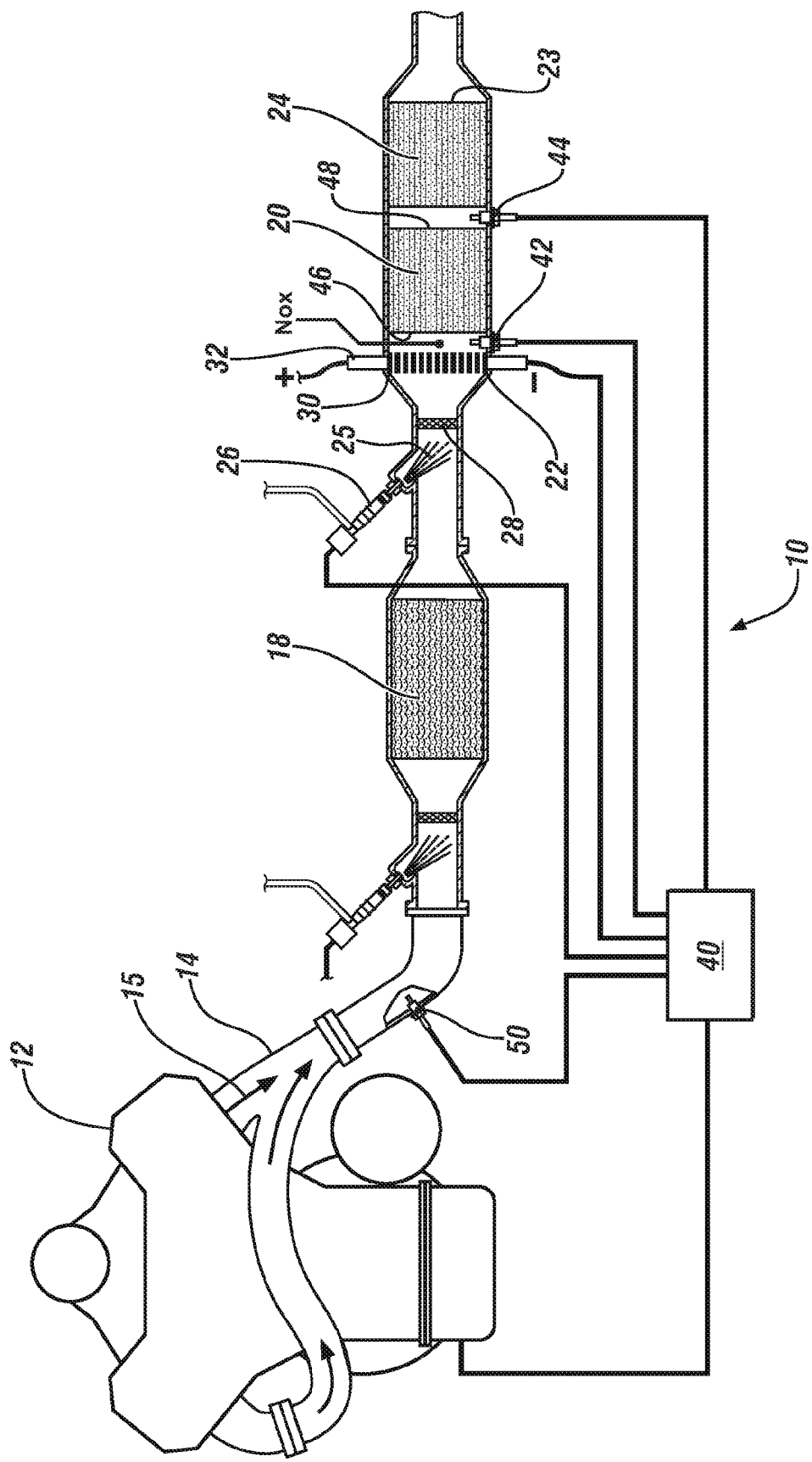
FIG. 1 is a schematic diagram of an exemplary exhaust gas treatment system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an oxidation catalyst device (OC) 18, a passive selective catalytic reduction device ("SCR") 20, a heated SCR device 22, and a particulate filter device ("PF") 24. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC 18 may include, for example, a flow-through metal or ceramic monolith substrate that is packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The passive SCR 20 and the heated SCR 22 may be both be disposed downstream of the OC 18. In a manner similar to the OC 18, the passive SCR 20 and the heated SCR may each include, for example, a flow-through ceramic or metal monolith substrate that is packaged in a stainless steel shell or canister having an inlet and an outlet in fluid communication with exhaust gas conduit 14. The substrate can include an SCR catalyst composition applied thereto. The SCR catalyst composition can contain a zeolite and one or more base metal components such as iron (Fe), cobalt (Co), copper (Cu) or vanadium (V) which can operate efficiently to convert $NO_x$ constituents in the exhaust gas 15 in the presence of a reductant such as ammonia ($NH_3$).

The heated SCR 22 is an SCR unit 30 combined with an electrical heater 32, where the electrical heater 32 is selectively activated and heats the SCR unit 30. The electrical heater 32 is connected to an electrical source (not shown) that provides power to the electrical heater 32. In one embodiment, the electrical heater 32 operates at a voltage of about 12-24 volts and at a power range of about 1-3 kilowatts, however it is understood that other operating conditions may be used as well. The heated SCR device 22 is located upstream of the passive SCR 20 in the exhaust gas conduit 14. The electrical heater 32 provides heat to the SCR unit 30 to heat the SCR unit 30 to a minimum operating or light-off temperature. The minimum operating temperature is the temperature that is needed to convert a reductant such as, for example, urea, into $NH_3$. In one exemplary embodiment, the minimum operating temperature is about 200° C., however it is understood that the minimum operating temperature may vary depending on $NO_x$ efficiency requirements. The heated SCR device 22 also provides heat to the passive SCR 20 to heat the passive SCR 20 to the minimum operating temperature as well.

An ammonia ($NH_3$) reductant 25 may be supplied from a reductant supply source (not shown) and may be injected into the exhaust gas conduit 14 at a location upstream of the passive SCR 20 and the heated SCR 22 using an injector 26, or other suitable method of delivery of the reductant to the exhaust gas 15. The reductant 25 may be in the form of a gas, a liquid, or an aqueous urea solution and may be mixed with air in the injector 26 to aid in the dispersion of the injected spray. A mixer or turbulator 28 may also be disposed within the exhaust conduit 14 in close proximity to the injector 26 to further assist in thorough mixing of the reductant 25 with the exhaust gas 15.

The PF 24 may be disposed downstream of the SCR 20. The PF 24 operates to filter the exhaust gas 15 of carbon and other particulates. In various embodiments, the PF 24 may be constructed using a ceramic wall flow monolith filter 23 that is may be packaged in a shell or canister constructed of, for example, stainless steel, and that has an inlet and an outlet in fluid communication with exhaust gas conduit 14. The ceramic wall flow monolith filter 23 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF 22 may include other filter devices such as wound or packed fiber filters, open cell foams, sintered metal fibers, etc.

A control module 40 is operably connected to and monitors the engine 12 and the exhaust gas treatment system 10 through a number of sensors. Specifically, FIG. 1 illustrates the control module 40 in communication with two temperature sensors 42 and 44, as well as an engine out $NO_x$ sensor 50 located in the exhaust gas conduit 14. The first temperature sensor 42 is situated between the passive SCR 20 and the heated SCR 22, and the second temperature sensor 44 is situated downstream of both the passive SCR 20 and the heated SCR 22. The temperature sensors 42, 44 send electrical signals to the control module 40 that each indicate the temperature in the exhaust gas conduit 14 in specific locations. The $NO_x$ sensor 50 is located in the exhaust gas conduit 14 downstream of the engine 12, and upstream of the passive SCR 20 and the heated SCR 22. The $NO_x$ sensor 50 sends an electrical signal to the control module 40 indicating the concentration of $NO_x$ in the exhaust gas $NO_{X1}$, and may be expressed in part per million (PPM).

The control module 40 is also operably connected to the electrical heater 32 of the heated SCR 22 and the reductant supply source (not shown). The control module 40 includes control logic for monitoring the temperature sensors 42, 44 and selectively activating the electrical heater 32 based on the temperature of the temperature sensors 42, 44. Specifically, the control module 40 includes control logic for determining the temperature profile of the passive SCR 20 based on the first and second temperature sensors 42, 44. The temperature profile of the passive SCR 20 represents the overall temperature of the passive SCR device 20, and is based on the first temperature T1 detected by the first temperature sensor 42, and the second temperature T2 detected by the second temperature sensor 44. The second temperature T2 also represents the temperature of the heated SCR 20. The control module 40 includes control logic for averaging the first temperature T1 and the second temperature T2 together, where the average of the first temperature T1 and the second temperature T2 is the temperature profile $T_{avg\ SCR}$ of the passive SCR 20. The passive SCR 20 is heated through convection. Thus, a front face 46 of the passive SCR device 20 will be heated first, and a rear face 48 of the passive SCR device 20 will be heated more slowly than the front face 46. It should be noted that while FIG. 1 illustrates two temperature sensors 42, 44, in an alternative embodiment the temperature sensors 42, 44 may be omitted. Instead, the control module 40 may include control logic for calculating the temperature profile $T_{avg\ SCR}$ of the passive SCR 20 based on the operating conditions of the exhaust gas system 10 and the engine 12, as well as the mass of the passive SCR device 20. Specifically, the temperature profile $T_{avg\ SCR}$ of the passive SCR 20 could be calculated based on the exhaust gas inlet temperature that is measured by a temperature sensor (not shown) located in the exhaust gas conduit 14 upstream of the OC 18, the mass flow rate or exhaust flow ("Exh_Flow") of the engine 12, and the mass of the passive SCR unit 20. The Exh_Flow of the engine 12 is calculated by adding the intake air mass of the engine 12 and the fuel mass of the engine 12. The intake air mass is measured using an intake air mass flow sensor (not shown) of the engine 12, which measures air mass flow entering the engine 12. The fuel mass flow is measured by summing the total amount of fuel injected into the engine 12 per second. The fuel mass flow is added to the air mass flow rate to calculate the exhaust flow Exh_Flow of the engine 12.

The control module 40 includes control logic for selectively activating the heated SCR 22 based on the temperature profile $T_{avg\ SCR}$ of the passive SCR 22. Specifically, if the temperature profile $T_{avg\ SCR}$ of the passive SCR 22 is below a light-off or minimum operating temperature, then the electrical heater 32 is activated to heat the SCR unit 30, and the SCR unit 30 is warmed to the minimum operating temperature. Thus, because the SCR unit 30 is heated to the minimum operating temperature, the heated SCR device 22 converts the reductant into ammonia and generally effectively lowers the amount of $NO_x$ in the exhaust gas 15. The heated SCR device 22 converts the reductant into ammonia more quickly than a conventional SCR device that does not include an electrical heater 32. Including a separate heated SCR 22 tends to increase light-off timing of the SCR unit 30 after engine start up and improves $NO_x$ efficiency when compared to an exhaust treatment system that does not include a heated SCR 22. Including the heated SCR device 22 will also improve fuel economy of the engine 12, Board Diagnostics-Second Generation (OBDII) emissions margins, and reduce the regeneration frequency of the PF 24 when compared to an exhaust treatment system that does not include a heated SCR 22.

The control module 40 also includes control logic for determining the amount of reductant 25 dosed by the injector 26, as well as control logic for activating the injector 26 to dose reductant. The amount of reductant 25 dosed by the injector 26 is based on the first temperature T1, the second temperature T2, the temperature profile $T_{avg\ SCR}$ of the passive SCR 20, and the concentration of $NO_{x1}$ in the exhaust gas 15. The amount of reductant dosed by the injector 26 is also based on the mass flow rate or exhaust flow Exh_Flow of the engine 12.

The amount of reductant 15 dosed by the injector 26 is also based on values that are stored in the memory of the control module 40. Specifically, the amount of reductant 25 dosed by the injector 26 is based on the amount of catalyst ("SCR_vol$_1$") located in the passive SCR 20, as well as the amount of catalyst ("SCR_vol$_2$") located in the heated SCR 22. Both of the values SCR_vol$_1$ and SCR_vol$_2$ are stored in the memory of the control module 40. The amount of reductant dosed by the injector 26 is also based on a calculated value of $NO_x$ that is located between the passive SCR 20 and the PF 24, (denoted as "$NO_x$'"). The control module 40 includes control logic for determining the calculated value $NO_x$'. The calculated value $NO_x$' is calculated based on the second temperature T2, the Exh_Flow of the engine 12, and the concentration of $NO_x$ in the exhaust gas 15. The calculated value $NO_x$' represents the amount of $NO_x$ that is removed by the heated SCR device 22.

The amount of reductant dosed by the injector 26 is a function of the concentration of $NO_{x1}$ in the exhaust gas 15, the calculated value $NO_x$', the second temperature T2 (which represents the temperature of the heated SCR 20), the temperature profile SCR_vol$_2$ of the passive SCR 22, the exhaust flow Exh_Flow of the engine 12, the amount of catalyst SCR_vol$_1$ located in the passive SCR 20, and the amount of catalyst SCR SCR_vol$_2$ located in the heated SCR 22. The concentration of $NO_{x1}$ in the exhaust gas 15, the second temperature T2 which represents the temperature of the heated SCR 22, the exhaust flow Exh_Flow of the engine 12, and the amount of catalyst SCR_vol$_2$ located in the heated SCR 22 are combined together and are denoted as a first function $F_1$. The first function $F_1$ represents the operating conditions of the heated SCR device 22. The first function $F_1$ is added to a second function $F_2$, where the second function $F_2$ represents the operating conditions of the passive SCR device 20. The second function $F_2$ is based on the calculated value $NO_x$', the temperature profile of the passive SCR 22, the exhaust flow Exh_Flow of the engine 12, and the amount of catalyst SCR_vol$_1$ located in the passive SCR 22. In one embodiment, the amount of reductant 25 dosed by the injector 26 is calculated by adding the first function $F_1$ to the second function $F_2$, and can be expressed by:

Amount of reductant dosed by injector 26=$F1+F2$

Figure 2:
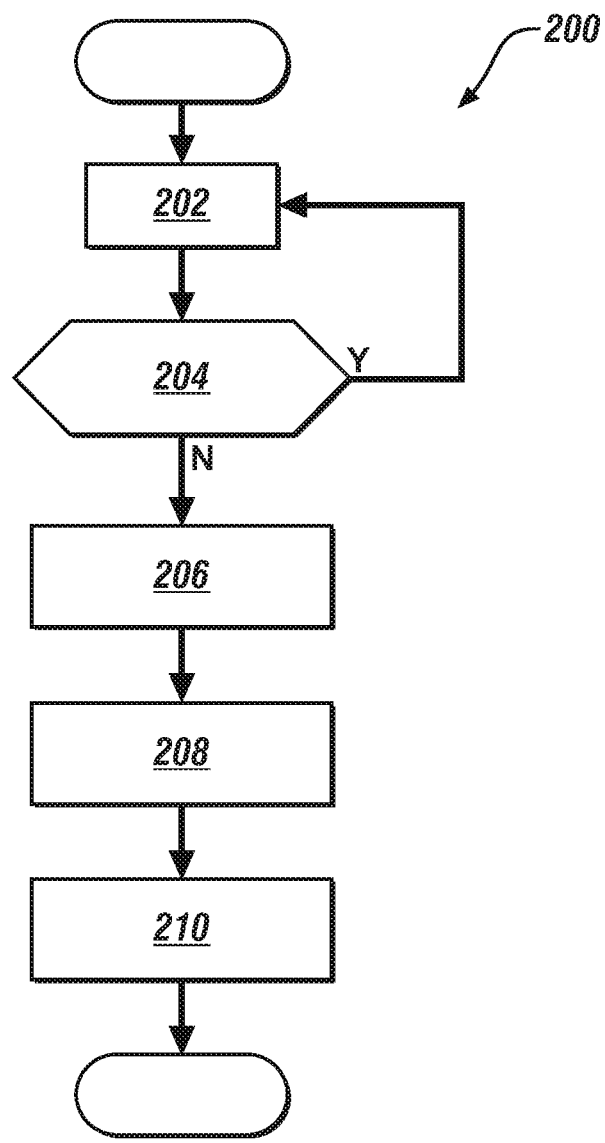
FIG. 2 is a process flow diagram illustrating a method of activating an SCR device illustrated in FIG. 1.

A method of operating the exhaust gas treatment system 10 will now be explained. Referring to FIG. 2, an exemplary process flow diagram illustrating an exemplary process of operating the exhaust gas treatment system 10 is generally indicated by reference number 200. Process 200 begins at step 202, where a control module 40 includes control logic for monitoring the temperature profile of a passive SCR 20. Specifically, referring back to FIG. 1, the control module 40 is in communication with two temperature sensors 42 and 44, where a first temperature sensor 42 is situated between the passive SCR 20 and a heated SCR 22, and a second temperature sensor 44 is situated downstream of both the passive SCR 20 and the heated SCR 22. The temperature profile of the passive SCR 20 is based on the first temperature T1 detected by the first temperature sensor 42, and the second temperature T2 detected by the second temperature sensor 44. The control module 40 includes control logic for averaging the first temperature T1 and the second temperature T2 together, where the average of the first temperature T1 and the second temperature T2 is the temperature profile SCR $T_{avg\ SCR}$ of the passive 20. Method 200 may then proceed to step 204.

In step 204, the control module 40 includes control logic for determining if the temperature profile SCR $T_{avg\ SCR}$ of the passive SCR 20 exceeds a minimum operating temperature. The minimum operating temperature is the temperature that is needed to convert a reductant such as, for example, urea, into $NH_3$. In one exemplary embodiment, the minimum operating temperature is about 200° C., however it is understood that the minimum operating temperature may vary depending on $NO_x$ efficiency requirements, where the temperature profile of the passive SCR 20 is monitored. If the passive SCR temperature $T_{avg\ SCR}$ exceeds the minimum operating temperature (which is denoted by a "Y" in FIG. 2), method 200 proceeds back to step 202, where the temperature profile of the passive SCR is monitored. If the temperature profile $T_{avg\ SCR}$ of the passive SCR 20 does not exceed the minimum operating temperature (which is denoted by an "N" in FIG. 2), then method 200 proceeds to step 206.

In step 206, the heated SCR 22 is activated. Specifically, an electrical heater 32 of the heated SCR 22 is activated and heats the SCR unit 30 to the minimum operating temperature. Method 200 may then proceed to step 208.

In step 208, the control module includes control logic for determining the amount of reductant to be dosed by an injector 26. The amount of reductant 25 dosed by the injector 26 is based on the concentration of $NO_{x1}$ in the exhaust gas 15, the calculated value $NO_x$', the second temperature T2 (which represents the temperature of the heated SCR 20), the temperature profile $T_{avg\ SCR}$ of the passive SCR 20, the exhaust flow Exh_Flow of the engine 12, the amount of catalyst SCR_vol$_1$ in the passive SCR 20, and the amount of catalyst SCR_vol$_2$. located in the heated SCR 22. Method 200 may then proceed to step 210.

In step 210, the control module 40 includes control logic for activating the injector 26, where the injector 26 doses reductant 25. The reductant 25 may be injected into the exhaust gas conduit 14 at a location upstream of the passive SCR 20. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
    an exhaust gas conduit in fluid communication with, and configured to receive an exhaust gas from the internal combustion engine;
    a passive selective catalyst reduction (SCR) device in fluid communication with the exhaust gas conduit and configured to receive the exhaust gas, wherein the overall temperature of the passive SCR device is represented by a passive SCR temperature profile;
    a heated SCR device in fluid communication with the exhaust gas conduit and configured to receive the exhaust gas, the heated SCR device located upstream of the passive SCR, and wherein the heated SCR is selectively activated to produce heat;
    a control module in communication with the heated SCR and the internal combustion engine, comprising:
        a control logic for determining the passive SCR temperature profile;
        a control logic for determining if the passive SCR temperature profile is below a threshold value; and
        a control logic for activating the heated SCR, wherein the heated SCR is activated if the passive SCR temperature is below the threshold value;
    a first temperature sensor situated between the passive SCR and the heated SCR; and
    a second temperature sensor situated downstream of both the passive SCR and the heated SCR.

2. The exhaust treatment system of claim 1, wherein the control module includes a control logic for monitoring the first temperature sensor and the second temperature sensor.

3. The exhaust treatment system of claim 2, wherein the control module includes a control logic for calculating the passive SCR temperature profile based on signals from the first temperature sensor and the second temperature sensor, wherein the temperatures of the first temperature sensor and the second temperature sensor are averaged together to create the passive SCR temperature profile.

4. The exhaust treatment system of claim 1, wherein the control module includes a control logic for calculating the passive SCR temperature profile based on the operating conditions of the exhaust gas system, the internal combustion engine, and the mass of the passive SCR device.

5. The exhaust treatment system of claim 1, wherein a reductant injector is in fluid communication with the exhaust gas conduit and is in signal communication with the control module.

6. The exhaust treatment system of claim 5, wherein the control module includes a control logic for determining an amount of reductant dosed to be by the reductant injector.

7. The exhaust treatment system of claim 6, wherein a NO$_x$ sensor is in fluid communication with the exhaust gas conduit and is located downstream of the internal combustion engine and upstream of the heated SCR to detect a NO$_x$ concentration level.

8. The exhaust treatment system of claim 7, wherein the control module includes a memory, and wherein the memory stores values indicating an amount of catalyst in the passive SCR and an amount of catalyst in the heated SCR.

9. The exhaust treatment system of claim 8, wherein the control module includes an control logic for calculating the exhaust flow of the internal combustion engine, wherein the exhaust flow of the internal combustion engine is calculated by adding an intake air mass of the internal combustion engine and a fuel mass of the internal combustion engine.

10. The exhaust treatment system of claim 9, wherein the control module includes a control logic for calculating a concentration of NO$_x$ that is located in the exhaust gas conduit between the heated SCR and the passive SCR, and wherein the concentration of NO$_x$ is a calculated NO$_x$ concentration level based on a temperature of the heated SCR, the exhaust flow of the internal combustion engine, and the NO$_x$ concentration level.

11. The exhaust treatment system of claim 9, wherein the amount of reductant dosed by the reductant injector is based on the NO$_x$ concentration level, the calculated NO$_x$ concentration level, the passive SCR temperature profile, the temperature of the heated SCR, the exhaust flow of the internal combustion engine, the amount of catalyst located in the passive SCR, and the amount of catalyst located in the heated SCR.

12. An exhaust gas treatment system for an internal combustion engine, comprising:
    an exhaust gas conduit in fluid communication with, and configured to receive an exhaust gas from the internal combustion engine;
    a passive selective catalyst reduction (SCR) device in fluid communication with the exhaust gas conduit and configured to receive the exhaust gas, wherein the overall temperature of the passive SCR device is represented by a passive SCR temperature profile;
    a heated SCR device in fluid communication with the exhaust gas conduit and configured to receive the exhaust gas, the heated SCR device located upstream of the passive SCR, and wherein the heated SCR is selectively activated to produce heat;
    a first temperature sensor located between the passive SCR and the heated SCR and a second temperature sensor located downstream of both the passive SCR and the heated SCR; and
    a control module in communication with the first temperature sensor, the second temperature sensor, the heated SCR and the internal combustion engine, comprising:
        a control logic for monitoring the first temperature sensor and the second temperature sensor;
        a control logic for calculating the passive SCR temperature profile based on signals from the first temperature sensor and the second temperature sensor, wherein the temperatures of the first temperature sensor and the second temperature sensor are averaged together to create the passive SCR temperature profile;
        a control logic for determining if the passive SCR temperature profile is below a threshold value; and a control logic for activating the heated SCR, wherein the heated SCR is activated if the passive SCR temperature is below the threshold value.

13. The exhaust treatment system of claim 12, wherein a reductant injector is in fluid communication with the exhaust gas conduit and is in signal communication with the control module.

14. The exhaust treatment system of claim 13, wherein the control module includes a control logic for determining an amount of reductant to be dosed by the reductant injector.

15. The exhaust treatment system of claim 14, wherein a $NO_x$ sensor is in fluid communication with the exhaust gas conduit and is located downstream of the internal combustion engine and upstream of the heated SCR to detect a $NO_x$ concentration level.

16. The exhaust treatment system of claim 15, wherein the control module includes a memory, and wherein the memory stores values indicating an amount of catalyst in the passive SCR and an amount of catalyst in the heated SCR.

17. The exhaust treatment system of claim 16, wherein the control module includes a control logic for calculating the exhaust flow of the internal combustion engine, wherein the exhaust flow of the internal combustion engine is calculated by adding an intake air mass of the internal combustion engine and a fuel mass of the internal combustion engine.

18. The exhaust treatment system of claim 17, wherein the control module includes a control logic for calculating a concentration of $NO_x$ that is located in the exhaust gas conduit between the heated SCR and the passive SCR, and wherein the concentration of $NO_x$ is a calculated $NO_x$ concentration level based on a temperature of the heated SCR, the exhaust flow of the internal combustion engine, and the $NO_x$ concentration level.

19. The exhaust treatment system of claim 18, wherein the amount of reductant dosed by the reductant injector is based on the $NO_x$ concentration level, the calculated $NO_x$ concentration level, the passive SCR temperature profile, a temperature of the heated SCR, the exhaust flow of the internal combustion engine, the amount of catalyst located in the passive SCR, and the amount of catalyst located in the heated SCR.

* * * * *